May 26, 1931.　　　F. M. HAWLEY　　　1,806,902
AUTOMATIC CHAIN TIGHTENER DEVICE
Filed April 16, 1928
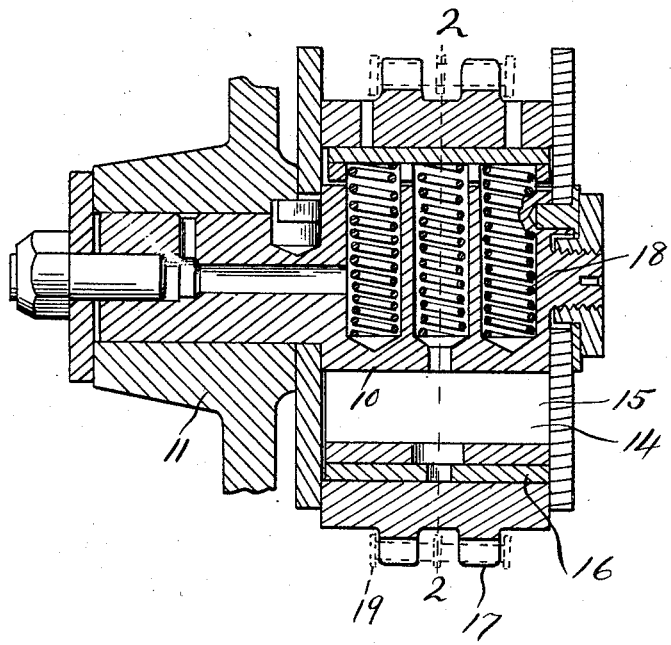
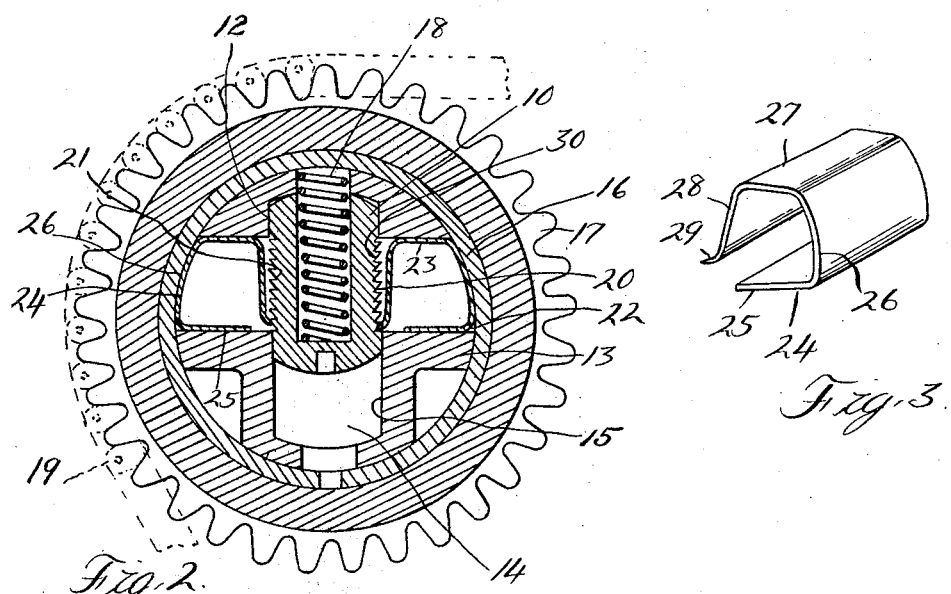
Inventor
Frank M. Hawley
By Whittemore, Hulbert, Whittemore & Belknap
Attorneys Patented May 26, 1931

1,806,902

UNITED STATES PATENT OFFICE

FRANK M. HAWLEY, OF DETROIT, MICHIGAN, ASSIGNOR TO MORSE CHAIN COMPANY, OF ITHACA, NEW YORK, A CORPORATION OF NEW YORK

AUTOMATIC CHAIN TIGHTENER DEVICE

Application filed April 16, 1928. Serial No. 270,523.

The invention relates to certain improvements in automatic chain tighteners of the type described in my co-pending application, Serial No. 157,401, filed December 27, 1926.

The primary object of the invention is to improve upon the construction disclosed in said application by simplification of the arrangement and elimination of parts, thereby reducing the cost of manufacture without decreasing the efficiency of the device. This is accomplished by providing the novel features of construction hereinafter described and illustrated in the accompanying drawings, wherein Figure 1 is an axial section through a chain tightener embodying my invention;

Figure 2 is a transverse section therethrough on the line 2—2 of Figure 1;

Figure 3 is a perspective view of the spring latch.

Referring now to the construction as illustrated in the drawings, the chain tightener comprises a supporting member 10 adapted to be suitably secured to a fixed support 11 and provided at one end with the parallel side surfaces 12. 13 is a sliding member having a recess 14 therein with parallel side surfaces 15 adapted to slidably engage the parallel surfaces of said supporting member 10. The slide 13 has a circular periphery on which is mounted a bushing 16 for rotatably mounting the sprocket 17.

For automatically moving the bearing in one direction relative to the supporting member, the latter is provided with a series of coil springs 18 abutting the bushing 16, thereby urging the bearing and the sprocket in a direction such as to take up any slack in the chain 19 associated with the sprocket. The arrangement of the supporting member 10 is such that the reaction from the chain 19 tends to limit the outward movement of the bearing by the springs 18.

A ratchet and pawl mechanism is provided for limiting the movement of the sliding member 13 in the direction opposite to that caused by the springs 18. This mechanism consists of the ratchet teeth 20 and 21 formed on opposite sides of the side surfaces 12. The sliding member 13 has laterally projecting recesses 22 on opposite sides of the recess 14, each of which has the substantially parallel side surfaces 23. The bottom of each recess is formed by the inner surface of the bushing 16. The ratchet pawls for cooperating with the ratchet teeth 21 are formed preferably from a sheet of spring metal which is bent into the configuration illustrated in Figure 3. As shown in this figure the ratchet pawls or latch member 24 has a flat portion 25, a transversely extending arcuate portion 26, a second substantially flat portion 27 extending at a slight inclination to the flat portion 25 and spaced from the same. 28 is a downturned portion extending at substantially right angles to the flat portion 27 and having at its free end the inclined lip 29. The spring 24 is inserted into the recess 22 by springing the flat surface 27 into parallelism with the flat portion 25 and allowing the arcuate portion 26 to engage the inner surface of the bushing. In this way the lip 29 is caused to engage the ratchet teeth 20 and is held in place by the resiliency of the sheet metal. As illustrated in Figure 2 a latch is provided on each side of the supporting member 10 and these are substantially identical. However, the arrangement is such that when one latch engages the shoulder portion 30 of a cooperating ratchet tooth the opposite latch is between the consecutive shoulders on the other set of ratchet teeth so that only one latch functions to hold the slide in position at one time.

In the operation of the device the slide is set with respect to the supporting member so that the springs 18 are compressed to their full extent and the chain is placed in position on the sprocket at this time. The tension of the chain prevents sliding movement of the slide with respect to the supporting member, but when slack develops in the chain the springs 18 urge the sliding member in a direction to take up the slack, and in so doing cause the latches to ride on the sides of said teeth. When the movement of the slide is sufficient one of the latches engages the shoulder of the next ratchet tooth and thus prevents return movement of the slide. As further slack develops in the chain the sliding member is urged further by the springs 18 until the opposite latch engages the shoulder of the next adjacent tooth. Thus the latches function alternately to prevent return movement of the slide and for this reason the maximum amount of play in the chain is represented by one-half the distance between adjacent ratchet teeth.

The latch member 23 as described above is simple in construction and yet forms an effective ratchet pawl adapted to at all times remain in engagement with the ratchet teeth. It will be observed that the construction is such that the member 24 is retained in position within the recess 22 by the resiliency of the metal when the corner between the sides 27 and 28 is sprung into the recess. It will also be observed that the sides 24, 26 and 27 are in firm engagement with the sliding member 13, while the side 28 is free to flex laterally although resiliently held in engagement with the ratchet teeth by the spring action of the metal itself. My improved construction therefore provides in one part a ratchet pawl, a pivotal mounting and spring action, whereas in constructions heretofore used in automatic chain tighteners, separate parts have been required to accomplish each of these functions.

What I claim as my invention is:

1. In a tightener for flexible drive connections, the combination of a support, a bearing slidably mounted on said support, a revoluble member on said bearing, means for resiliently urging said bearing in one direction relative to said support, ratchet teeth on said support and a latch carried by said bearing and engageable with said ratchet teeth, said latch comprising a spring metal clip having an arm projecting into engagement with said ratchet teeth.

2. In a tightener for flexible drive connections, the combination of a support, a bearing slidable on said support having a recess therein, means for resiliently urging said bearing in one direction relative to said support, ratchet teeth on said support and a sheet metal latch member in said recess having an arm of spring metal resiliently engaging said ratchet teeth.

3. In a tightener for flexible drive connections, the combination of a support, a bearing slidably mounted on said support having a recess therein, a revoluble member on said bearing, means for resiliently urging said bearing in one direction relative to said support, ratchet teeth on said support and a sheet metal member having a channel-shaped portion seated in said recess and an arm extending laterally from one side of said channel-shaped portion, said arm being provided with an inclined lip for engaging said ratchet teeth.

4. In a tightener for flexible drive connections, the combination of a support, a bearing slidably mounted on said support having a recess therein, a revoluble member on said bearing, means for resiliently urging said bearing in one direction relative to said support, ratchet teeth on said support and a spring sheet metal strip sprung into said recess and having a spring arm engaging said ratchet teeth.

5. In a tightener for flexible drive connections, the combination of a support having ratchet teeth thereon, a bearing member slidable on said support having recesses on opposite sides thereof extending transversely to the direction of sliding, a bushing surrounding said bearing and forming a curved bottom for each recess and a spring clip in each of said recesses comprising a sheet metal member having a channel-shaped portion engaging the sides of said recess and an integral arm extending across the open side of said channel into engagement with said ratchet teeth.

6. In a tightener for flexible drive connections, the combination of a support having ratchet teeth thereon, a bearing member slidable on said support having recesses on opposite sides thereof extending transversely to the direction of sliding, a bushing surrounding said bearing and forming a curved bottom for each recess and a spring latch of channel-shaped form resiliently held in position in one of said recesses and having an arm projecting across the open side of said channel and having an inclined portion at the end of said arm extending into engagement with said ratchet teeth.

7. In an automatic chain tightener, the combination of a support having ratchet teeth, a member mounted upon said support, means for guiding said member in a rectilinear path relative to said support, spring means between said support and said member acting in the same direction as said rectilinear path and a spring metal clip having an arm projecting into engagement with said ratchet teeth for limiting the movement of said member in the opposite direction relative to said support.

In testimony whereof I affix my signature.
FRANK M. HAWLEY.